US 7,921,325 B2

(12) United States Patent
Kondo et al.

(10) Patent No.: US 7,921,325 B2
(45) Date of Patent: Apr. 5, 2011

(54) NODE MANAGEMENT DEVICE AND METHOD

(75) Inventors: Atsushi Kondo, Yokohama (JP); Makoto Aoki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 611 days.

(21) Appl. No.: 12/007,642

(22) Filed: Jan. 14, 2008

(65) Prior Publication Data

US 2008/0270820 A1 Oct. 30, 2008

(30) Foreign Application Priority Data

Apr. 24, 2007 (JP) ................................ 2007-114170

(51) Int. Cl.
G06F 11/00 (2006.01)
(52) U.S. Cl. ............................................................ 714/4
(58) Field of Classification Search ........................ 714/4
See application file for complete search history.

(56) References Cited

U.S. PATENT DOCUMENTS

| | | | | |
|---|---|---|---|---|
| 6,145,089 A * | 11/2000 | Le et al. | ................ | 714/4 |
| 7,234,073 B1 * | 6/2007 | Roytman et al. | ........... | 714/4 |
| 7,240,234 B2 * | 7/2007 | Morita et al. | ............... | 714/4 |
| 7,409,586 B1 * | 8/2008 | Bezbaruah et al. | ........ | 714/13 |
| 7,480,814 B2 * | 1/2009 | Shinohara et al. | .......... | 714/4 |
| 7,606,986 B1 * | 10/2009 | Limaye et al. | ............ | 711/153 |
| 7,725,768 B1 * | 5/2010 | Bezbaruah et al. | ........ | 714/15 |
| 2002/0073354 A1 * | 6/2002 | Schroiff et al. | ............ | 714/4 |
| 2005/0120259 A1 * | 6/2005 | Aoki | ...................... | 714/5 |
| 2005/0268156 A1 * | 12/2005 | Mashayekhi et al. | ...... | 714/4 |
| 2006/0010338 A1 * | 1/2006 | Schroiff et al. | ............ | 714/4 |
| 2006/0015773 A1 * | 1/2006 | Singh et al. | .............. | 714/13 |
| 2006/0080568 A1 * | 4/2006 | Subbaraman et al. | ...... | 714/4 |
| 2006/0224764 A1 | 10/2006 | Shinohara et al. | | |
| 2007/0180314 A1 * | 8/2007 | Kawashima et al. | ...... | 714/15 |
| 2007/0234115 A1 * | 10/2007 | Saika | ...................... | 714/13 |
| 2008/0091746 A1 * | 4/2008 | Hatasaki et al. | ............ | 707/204 |
| 2008/0263390 A1 * | 10/2008 | Baba et al. | ................ | 714/4 |
| 2009/0089609 A1 * | 4/2009 | Baba | ...................... | 714/4 |

FOREIGN PATENT DOCUMENTS

JP 2006-260357 3/2005

* cited by examiner

*Primary Examiner* — Bryce P Bonzo
(74) *Attorney, Agent, or Firm* — Volpe and Koenig, P.C.

(57) ABSTRACT

A device that is communicably connected to each of three or more nodes constituting a cluster system holds resource information, which is information relating to a resource used by an application, in relation to each of the three or more nodes. The device receives resource condition information indicating variation in the condition of the resource from each node, updates the resource information on the basis of the received resource condition information, determines a following active node on the basis of the updated resource information, and notifies at least one of the three or more nodes of the determined following active node.

18 Claims, 11 Drawing Sheets

FIG. 3A  PATH TABLE 433a OF NODE 1

| PATH ID | LOGICAL DEVICE ID | HBA ID | CHA ID | LU ID | PATH STATE |
|---|---|---|---|---|---|
| 0001 | dev1 | HBA1 | CHA1 | LU1 | ONLINE |
| 0002 | dev1 | HBA2 | CHA1 | LU1 | ONLINE |
| 0003 | dev1 | HBA1 | CHA2 | LU1 | ONLINE |
| 0004 | dev1 | HBA2 | CHA2 | LU1 | ONLINE |
| 0005 | dev2 | HBA1 | CHA1 | LU2 | ONLINE |
| 0006 | dev2 | HBA2 | CHA1 | LU2 | ONLINE |
| 0007 | dev2 | HBA1 | CHA3 | LU2 | OFFLINE |
| 0008 | dev2 | HBA2 | CHA2 | LU2 | ONLINE |

FIG. 3B  PATH TABLE 433b OF NODE 2

| PATH ID | LOGICAL DEVICE ID | HBA ID | CHA ID | LU ID | PATH STATE |
|---|---|---|---|---|---|
| 0001 | dev1 | HBA3 | CHA3 | LU3 | OFFLINE |
| 0002 | dev1 | HBA3 | CHA4 | LU3 | ONLINE |
| 0003 | dev1 | HBA4 | CHA3 | LU3 | OFFLINE |
| 0004 | dev1 | HBA4 | CHA4 | LU3 | ONLINE |
| 0005 | dev2 | HBA3 | CHA3 | LU4 | OFFLINE |
| 0006 | dev2 | HBA4 | CHA3 | LU4 | OFFLINE |
| 0007 | dev2 | HBA3 | CHA4 | LU4 | ONLINE |
| 0008 | dev2 | HBA4 | CHA4 | LU4 | ONLINE |

FIG. 3C  PATH TABLE 433c OF NODE 3

| PATH ID | LOGICAL DEVICE ID | HBA ID | CHA ID | LU ID | PATH STATE |
|---|---|---|---|---|---|
| 0001 | dev1 | HBA5 | CHA5 | LU5 | ONLINE |
| 0002 | dev1 | HBA5 | CHA6 | LU5 | ONLINE |
| 0003 | dev1 | HBA6 | CHA3 | LU5 | OFFLINE |
| 0004 | dev1 | HBA6 | CHA6 | LU5 | ONLINE |
| 0005 | dev2 | HBA5 | CHA5 | LU6 | ONLINE |
| 0006 | dev2 | HBA6 | CHA5 | LU6 | ONLINE |
| 0007 | dev2 | HBA5 | CHA6 | LU6 | ONLINE |
| 0008 | dev2 | HBA6 | CHA6 | LU6 | ONLINE |

FIG. 3D  PATH TABLE 433d OF NODE 4

| PATH ID | LOGICAL DEVICE ID | HBA ID | CHA ID | LU ID | PATH STATE |
|---|---|---|---|---|---|
| 0001 | dev1 | HBA7 | CHA7 | LU7 | ONLINE |
| 0002 | dev1 | HBA8 | CHA7 | LU7 | ONLINE |
| 0003 | dev1 | HBA7 | CHA8 | LU7 | ONLINE |
| 0004 | dev1 | HBA8 | CHA8 | LU7 | ONLINE |
| 0005 | dev2 | HBA7 | CHA7 | LU8 | ONLINE |
| 0006 | dev2 | HBA7 | CHA3 | LU8 | OFFLINE |
| 0007 | dev2 | HBA8 | CHA7 | LU8 | ONLINE |
| 0008 | dev2 | HBA8 | CHA8 | LU8 | ONLINE |

FIG. 5

PATH MANAGEMENT TABLE 124

| NODE ID | PATH ID | LOGICAL DEVICE ID | HBA ID | CHA ID | LU ID | PATH STATE |
|---|---|---|---|---|---|---|
| ND1 | 0001 | dev1 | HBA1 | CHA1 | LU1 | ONLINE |
| | 0002 | dev1 | HBA2 | CHA1 | LU1 | ONLINE |
| | 0003 | dev1 | HBA1 | CHA2 | LU1 | ONLINE |
| | 0004 | dev1 | HBA2 | CHA2 | LU1 | ONLINE |
| | 0005 | dev2 | HBA1 | CHA1 | LU2 | ONLINE |
| | 0006 | dev2 | HBA2 | CHA1 | LU2 | ONLINE |
| | 0007 | dev2 | HBA1 | CHA3 | LU2 | OFFLINE |
| | 0008 | dev2 | HBA2 | CHA2 | LU2 | ONLINE |
| ND2 | 0001 | dev1 | HBA3 | CHA3 | LU3 | OFFLINE |
| | 0002 | dev1 | HBA3 | CHA4 | LU3 | ONLINE |
| | 0003 | dev1 | HBA4 | CHA3 | LU3 | OFFLINE |
| | 0004 | dev1 | HBA4 | CHA4 | LU3 | ONLINE |
| | : | : | : | : | : | : |
| ND3 | 0001 | dev1 | HBA5 | CHA5 | LU5 | ONLINE |
| | 0002 | dev1 | HBA5 | CHA6 | LU5 | ONLINE |
| | 0003 | dev1 | HBA6 | CHA3 | LU5 | OFFLINE |
| | 0004 | dev1 | HBA6 | CHA6 | LU5 | ONLINE |
| | : | : | : | : | : | : |
| ND4 | 0001 | dev1 | HBA7 | CHA7 | LU7 | ONLINE |
| | 0002 | dev1 | HBA8 | CHA7 | LU7 | ONLINE |
| | 0003 | dev1 | HBA7 | CHA8 | LU7 | ONLINE |
| | 0004 | dev1 | HBA8 | CHA8 | LU7 | ONLINE |
| | : | : | : | : | : | : |

RESOURCE TABLE 125

| AP ID | LOGICAL DEVICE ID | NODE ID | ONLINE PATH NUMBER | TOTAL PATH NUMBER | MAIN NODE |
|---|---|---|---|---|---|
| AP1 | dev1 | ND1 | 4 | 4 | TRUE |
| | | ND2 | 2 | 4 | FALSE |
| | | ND3 | 3 | 4 | FALSE |
| | | ND4 | 4 | 4 | FALSE |
| AP2 | dev2 | ND1 | 3 | 4 | TRUE |
| | | ND2 | 2 | 4 | FALSE |
| | | ND3 | 4 | 4 | FALSE |
| | | ND4 | 3 | 4 | FALSE |

FIG. 7

SYSTEM SWITCHING ORDER TABLE 126

| AP ID | SYSTEM SWITCHING ORDER | | | |
|---|---|---|---|---|
| | 1 | 2 | 3 | 4 |
| AP1 | ND1 | ND2 | ND3 | ND4 |
| AP2 | ND2 | ND3 | ND4 | ND1 |

FIG. 13A

SYSTEM SWITCHING ORDER TABLE 126 BEFORE MODIFICATION

| AP ID | SYSTEM SWITCHING ORDER | | | |
|---|---|---|---|---|
| | 1 | 2 | 3 | 4 |
| AP1 | ND1 | ND2 | ND3 | ND4 |
| AP2 | ND2 | ND3 | ND4 | ND1 |

AP DEFINITION FILE 423 BEFORE MODIFICATION

423a

```
# DEFINITION FILE OF AP 1
    :
# LOGICAL DEVICE
DEVICE_NAME    dev1
    :
# SYSTEM SWITCHING ORDER
  NODE_NAME  ND1
  NODE_NAME  ND2
  NODE_NAME  ND3
  NODE_NAME  ND4
    :
```

423b

```
# DEFINITION FILE OF AP 2
    :
# LOGICAL DEVICE
DEVICE_NAME    dev2
    :
# SYSTEM SWITCHING ORDER
  NODE_NAME  ND2
  NODE_NAME  ND3
  NODE_NAME  ND4
  NODE_NAME  ND1
    :
```

FIG. 14A

SYSTEM SWITCHING ORDER TABLE 126 FOLLOWING MODIFICATION

| AP ID (1261) | SYSTEM SWITCHING ORDER (1262) | | | |
|---|---|---|---|---|
| | 1 | 2 | 3 | 4 |
| AP1 | ND1 | ND4 | ND3 | ND2 |
| AP2 | ND2 | ND3 | ND4 | ND1 |

FIG. 14B

AP DEFINITION FILE 423 FOLLOWING MODIFICATION

423a
```
# DEFINITION FILE OF AP 1
            :
# LOGICAL DEVICE
DEVICE_NAME    dev1
            :
# SYSTEM SWITCHING ORDER
   NODE_NAME  ND1
   NODE_NAME  ND4
   NODE_NAME  ND3
   NODE_NAME  ND2
            :
```

423b
```
# DEFINITION FILE OF AP 2
            :
# LOGICAL DEVICE
DEVICE_NAME    dev2
            :
# SYSTEM SWITCHING ORDER
   NODE_NAME  ND2
   NODE_NAME  ND3
   NODE_NAME  ND4
   NODE_NAME  ND1
            :
```

NODE MANAGEMENT DEVICE AND METHOD

CROSS-REFERENCE TO PRIOR APPLICATION

This application relates to and claims the benefit of priority from Japanese Patent Application number 2007-114170, filed on Apr. 24, 2007, the entire disclosure of which is incorporated herein by reference.

BACKGROUND OF THE INVENTION

1. Field of the Invention

The present invention generally relates to the switching of nodes constituting a cluster system.

2. Description of the Related Art

Japanese Unexamined Patent Application Publication 2006-260357 or the like is known as a conventional technique relating to a node for controlling access to a storage device. In Japanese Unexamined Patent Application Publication 2006-260357, a plurality of nodes are provided in the form of a cluster system to respond to the occurrence of a fault in a node. In the cluster system, one of the plurality of nodes serves as an active system node for controlling access to a storage device, and the other nodes serve as standby system nodes that remain on standby until a fault occurs in the active system node. Thus, when a fault occurs in the active system node, one of the standby system nodes serves as the active system node in place of the faulty node, and as a result, access to the storage device can be controlled.

In a typical cluster system, node switching upon the occurrence of a fault is performed in accordance with a pre-defined node order. Hence, when a fault also occurs in a standby system node, node switching may be performed meaninglessly.

For example, in a case where a cluster system is constituted by four nodes (node 1, node 2, node 3, node 4) and the order thereof is defined as node 1→node 2→node 3→node 4, when no fault occurs, the first node in the node order, i.e. node 1, serves as the active system node and the other nodes, i.e. node 2, node 3, and node 4, serve as standby system nodes. Then, when a fault occurs in node 1, the standby system node having the highest order, i.e. node 2, is switched to become the active system node. Here, when a fault also occurs in node 2, further node switching is performed such that node 3, which follows node 2 in the node order, is switched to become the active system node. In other words, when a fault occurs in node 1 and a fault also occurs in node 2, the switch from node 1 to node 2 is meaningless. When meaningless switching is performed in this manner, an excessive amount of time is required for normal access to the storage device to become possible.

SUMMARY OF THE INVENTION

It is therefore an object of the present invention to enable appropriate node switching in a cluster system.

A device that is communicably connected to each of three or more nodes constituting a cluster system holds resource information, which is information relating to a resource used by an application, in relation to each of the three or more nodes. The device receives resource condition information indicating variation in the condition of the resource from each node, updates the resource information on the basis of the received resource condition information, and determines a following active node on the basis of the updated resource information. The device then notifies at least one of the three or more nodes of the determined following active node.

BRIEF DESCRIPTION OF THE DRAWINGS

FIG. 3 is a view showing examples of a path table;

FIG. 5 is a view showing an example of a path management table;

FIG. 6 is a view showing an example of a resource table;

FIG. 7 is a view showing an example of a system switching order table;

FIG. 13A is an example of the system switching order table before modification;

FIG. 13B is an example of the AP definition file before modification;

FIG. 14A is an example of the system switching order table following modification; and FIG. 14B is an example of the AP definition file following modification.

DESCRIPTION OF THE PREFERRED EMBODIMENT

Figure 1:
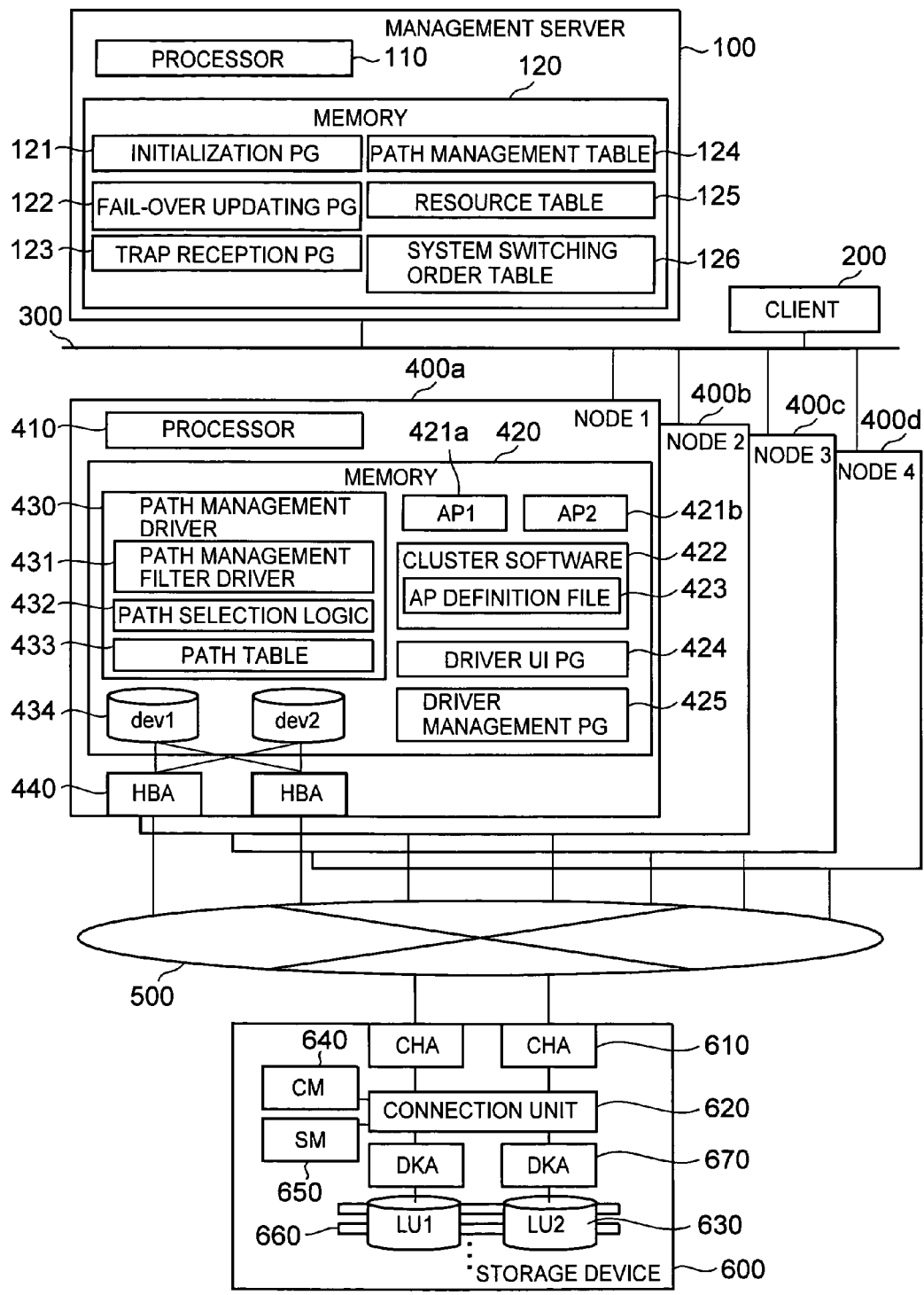
FIG. 1 is a view showing an example of the configuration of a computer system according to an embodiment.

In an embodiment, a node management device is configured by providing a device (a computer, for example) that is communicably connected to each of three or more nodes constituting a cluster system with a reception unit, an updating unit, a determination unit, and a notification unit. Resource information is stored in an internal storage resource of the node management device. The resource information is information for each of three or more nodes, relating to a resource used by an application. The reception unit receives resource condition information indicating variation in the condition of the resource from each node. The updating unit updates the resource information on the basis of the resource condition information received by the reception unit. The determination unit determines a following active node on the basis of the resource information updated by the updating unit. The notification unit notifies at least one of the three or more nodes of information indicating the following active node determined by the determination unit.

In the cluster system, one of the three or more nodes constituting the cluster system serves as an active node for controlling access to the storage device, and when a fault occurs in the active node, the active node is switched. The following active node is the node that becomes the new active node when the active node is switched. The notification unit may inform all of the nodes of the information indicating the following active node, which is determined by the determination unit, or only the active node, for example.

In an embodiment, the resource information includes a number of active paths from among a plurality of paths used by the application, of each node. The resource condition information received by the reception unit includes fault information indicating a fault or a fault recovery in the path, and node information specifying the node that detects the fault or the recovery. The updating unit updates the number of active paths corresponding to the node specified by the node information in the resource information on the basis of the fault information and the node information. The determination unit determines a node having the largest number of active paths, from among the nodes other than the active node, to be the following active node on the basis of the resource information updated by the updating unit.

In an embodiment, when the fault information indicates a fault in the path, the updating unit reduces the number of active paths corresponding to the node specified by the node information in the resource information, and when the fault information indicates a fault recovery in the path, the updating unit increases the number of active paths corresponding to the node specified by the node information in the resource information.

In an embodiment, the fault information received by the reception unit includes information indicating a fault or a fault recovery in the path, and a number of faulty paths, which is a number of paths in which a fault or a fault recovery has occurred. When the fault information indicates a fault in the path, the updating unit reduces the number of active paths corresponding to the node specified by the node information in the resource information by the number of faulty paths, and when the fault information indicates a fault recovery in the path, the updating unit increases the number of active paths corresponding to the node specified by the node information in the resource information by the number of faulty paths.

In an embodiment, the determination unit determines a node switching order indicating the order of the following active node and a subsequent active node order on the basis of the resource information updated by the updating unit. The notification unit notifies at least one of the three or more nodes of the node switching order determined by the determination unit.

The notification unit may inform all of the nodes of the node switching order determined by the determination unit, or only the active node, for example. Further, the determined node switching order and/or the notified node switching order is constituted by identification information (a node name, for example) for each of the three or more nodes and the order thereof, for example.

In an embodiment, the resource information includes an number of active paths, which is a number of active paths from among the plurality of paths used by the application, of each node. The resource condition information received by the reception unit includes fault information indicating a fault or a fault recovery in the path, and node information specifying the node that detects the fault or the recovery. The updating unit updates the number of active paths corresponding to the node specified by the node information in the resource information on the basis of the fault information and the node information. The determination unit determines the node switching order on the basis of the resource information updated by the updating unit such that the nodes are arranged in descending order of the number of active paths.

An embodiment further comprises node switching order information indicating the node switching order, and a second updating unit for comparing a first node switching order determined by the determination unit and a second node switching order indicated by the node switching order information, and updating the node switching order indicated by the node switching order information to the first switching order when the first node switching order and the second node switching order are different. When the node switching order information is updated, the notification unit notifies the nodes of the first switching order.

In an embodiment, when the number of active paths updated by the updating unit is equal to or lower than a predetermined threshold, the determination unit determines the node switching order on the basis of the resource information updated by the updating unit such that the nodes are arranged in descending order of the number of active paths.

In an embodiment, each of the three or more nodes has a plurality of applications. The resource information includes the number of active paths for each combination of the application and the node on which the application is run. The resource condition information received by the reception unit includes, in addition to the fault information and the node information, application information specifying the application. The updating unit updates the number of active paths corresponding to a combination of a node specified by the node information and an application specified by the application information in the resource information on the basis of the fault information, node information, and application information. The determination unit determines the node having the largest number of active paths, from among the nodes other than the active node, to be the following active node in relation to the three or more nodes having the application specified by the application information and on the basis of the resource information updated by the updating unit.

In an embodiment, the resource information includes the number of active paths and load information indicating a load of the application for each combination of the application and the node on which the application is run. The determination unit determines a node having the largest number of active paths of the nodes other than the active node and the smallest load indicated by the load information corresponding to the application specified by the application information to be the following active node in relation to the three or more nodes having the application and on the basis of the resource information updated by the updating unit.

Two or more of the plurality of embodiments described above may be combined. Further, each of the units described above (for example, the reception unit, update unit, determination unit, and notification unit) may be constructed using hardware, a computer program, or a combination thereof (the combination being realized partly by a computer program and partly by hardware, for example). The computer program is read and executed by a predetermined processor. Further, during information processing performed when the computer program is read by the processor, a storage area existing on a hardware resource such as memory may be used in an appropriate manner. Furthermore, the computer program may be installed on a computer from a recording medium such as a CD-ROM, or downloaded onto a computer via a communication network.

An embodiment of the present invention will be described below with reference to the drawings. Note that in the following description, when a computer program is used as the subject of a sentence, it is assumed that in actuality, processing is performed by the processor (CPU) that executes the computer program.

FIG. 1 is a view showing an example of the configuration of a computer system according to this embodiment.

A computer system (also referred to as "the system" hereafter) according to this embodiment comprises a management server 100, a client 200, a plurality of nodes 400, and a storage device 600. The management server 100, client 200, and plurality of nodes 400 are connected by a first communication network 300. Various networks, such as a LAN (Local Area Network), may be employed as the first communication network 300. The plurality of nodes 400 and storage device 600 are also connected by a second communication network 500. Various networks, such as a SAN (Storage Area Network), may be employed as the second communication network 500. The first communication network and second communication network may be provided as a single communication network. Note that the number of nodes 400 provided in the system is three or more. In this embodiment, four nodes 400 (node 400*a*, node 400*b*, node 400*c*, and node 400*d*) are provided. Hereafter, the node 400*a*, the node 400*b*, the node 400*c*, and the node 400*d* will occasionally be referred to as node 1, node 2, node 3, and node 4, respectively.

The node 400 is a computer that executes a predetermined application ("AP" hereafter) and issues an I/O request (write request/read request) to an LU (Logical Unit) 630 of the storage device 600 in accordance with a request from the client 200. The plurality of nodes 400 (here, node 1, node 2, node 3, and node 4) constitute a cluster system. In other words, one of the plurality of nodes 400 serves as a main node that actually runs the AP and processes requests from the client 200. The nodes 400 other than the main node serve as standby nodes that remain on standby in preparation for the occurrence of a fault in the main node (when on standby, these nodes 400 do not process requests from the client 200). When a fault occurs in the main node, one of the standby nodes selected in accordance with a predetermined system switching order (to be described below) becomes the main node, activates the AP, and processes a request from the client 200.

The node 400 comprises a processor (CPU) 410, a storage resource (memory 420, for example), and one or a plurality of HBAs (host bus adapters) 440, for example.

The HBA 440 is hardware provided in the node 400 for connecting to the SAN 500, and is constituted by an interface device supporting an FC (Fibre Channel) protocol or an SCSI protocol, for example.

Various storage resources, such as memory or a hard disk, may be employed as the storage resource. In this embodiment, the memory 420 is used. This applies likewise to the management server 100. An AP 421, a path management driver 430, client software 422, a driver UI PG (an abbreviation of "program") 424, and a driver management PG 425 are recorded in the memory 420 as computer programs that are executed by the processor 410, for example. The AP 421 may be provided in a plurality, and in this embodiment, two APs (an AP 421*a* and an AP 421*b*) are provided for each of the nodes 400*a*, 400*b*, 400*c*, 400*d*. Hereafter, the AP 421*a* and the AP 421*b* will occasionally be referred to respectively as AP 1 and AP 2.

A logical device 434 is recognized by mounting the LU 630 using an operating system (OS; not shown in the drawing) of the node 400. Hereafter, a recognized logical device 434 will occasionally be referred to as "dev 434". The AP 421 is capable of issuing an I/O request to the dev 434. The I/O request issued to the dev 434 is transmitted from the node 400 to the storage device 600 as an I/O request relating to the LU 630 corresponding to the dev 434. In this embodiment, two devs 434 (a dev 434*a* and a dev 434*b*) are provided in each of the nodes 400*a*, 400*b*, 400*c*, 400*d*. The dev 434*a* is used by the AP 1, and the dev 434*b* is used by the AP 2. Hereafter, the dev 434*a* and the dev 434*b* will occasionally be referred to respectively as dev 1 and dev 2.

The path management driver 430 performs management of an access path ("path" hereafter) from the dev 434 to the LU 630 corresponding to the dev 434, which is used by the AP 421 to issue an I/O request. The path is defined by the dev 434 from which it begins, the LU 630 to which it connects, and the HBA 440 and CHA 610 through which it passes. In other words, the path is defined by a combination of the dev 434, the HBA 440, a CHA 610, and the LU 630. Typically, a plurality of paths are provided for each dev 434 of each node 400. The path management driver 430 comprises a path management filter driver 431 and a path selection logic 432 as subprograms, for example. The path management driver 430 also comprises a path table 433.

The path management filter driver 431 issues an I/O request to the LU 630 of the storage device 600 using a path selected by the path selection logic 432. The path management filter driver 431 then notifies the AP 421 of the result of the I/O request. The path management filter driver 431 is capable of detecting a fault in the path (a physical fault in the equipment constituting the path (the HBA 440, the CHA 610, cables, and so on) or a logical fault such as a situation in which a physical fault has not occurred but a link cannot be established normally; to be referred to hereafter as a "path fault") from the result of the I/O request.

The path selection logic 432 selects a path to be used to issue an I/O request by referring to the path table 433. Further, when the path management filter driver 431 detects a path fault, the path selection logic 432 eliminates the faulty path from the path selection candidates. In other words, the path selection logic 432 does not select paths that are indicated to be inactive (offline) in the path table 433. The path table 433 will be described later.

The cluster software 422 is software for controlling the node 400 comprising the cluster software 422 such that the node 400 operates as one of the nodes 400 constituting the cluster system. For example, the cluster software 422 monitors the operations of the node 400 comprising the cluster software 422. Then, when a fault is detected in the node 400 serving as the main node, the cluster software performs main node switching in accordance with a system switching order, to be described below, in conjunction with the cluster software 422 provided in the other nodes 400. The cluster software 422 has an AP definition file 423 for each AP 421. In this embodiment, AP 1 and AP 2 run on the cluster system, and therefore the cluster software 422 has an AP definition file 423 relating to AP 1 and an AP definition file 423 relating to AP 2. The AP definition file 423 will be described later.

The driver management PG 425 monitors the path management driver 430, and when the path management driver 430 detects a path fault or path fault recovery ("path recovery" hereafter), notifies the management server 100 of information relating to the path fault or path recovery ("path fault/recovery information" hereafter). The path fault/recovery information includes information indicating whether a path fault or a path recovery has occurred, an ID of the node 400 that detected the path fault or path recovery (i.e. the ID of the node 400 itself), and an ID of the dev 434 corresponding to the faulty path or recovered path, for example. The ID of the dev 434 corresponding to the faulty path or recovered path is obtained by referring to the path table 433. An SNMP (Simple Network Management Protocol) trap, for example, is used to provide notification of the path fault/recovery information. The driver management PG 425 also performs a regular or irregular check as to whether or not the state of the path managed by the path management driver 430 is active or inactive. Hereafter, this checking processing will occasionally be referred to as "health check processing". When the driver management PG 425 detects that the state of a path has changed (i.e. that a path fault or path recovery has occurred)

in the health check processing, the driver management PG 425 informs the management server 100 of the path fault/recovery information relating thereto. Having detected the path fault or path recovery, the driver management PG 425 modifies predetermined information in the path table 433 on the basis of the path fault/recovery information.

The driver UI PG 424 is a program for providing a user interface (UI) enabling a manager to perform predetermined setting relating to the processing executed by the driver management PG 425. For example, the manager is capable of using the UI provided by the driver UI PG 424 to perform setting enabling the driver management PG 425 to perform path fault/path recovery information notification and health check processing.

The management server 100 is a server machine for managing the plurality of nodes 400. The management server 100 comprises a processor (CPU) 110 and memory 120, for example. Computer programs read and executed by the processor 110 and data used by the processor 110 are stored in the memory 120.

Examples of the computer programs include an initialization PG 121, a fail-over updating PG 122, and a trap reception PG 123. The trap reception PG 123 is a program for receiving the path fault/recovery information from the node 400. Upon reception of the path fault/recovery information, the trap reception PG 123 informs the fail-over updating PG 122 of this information. Further, upon reception of the path fault/recovery information, the trap reception PG 123 is capable of modifying predetermined information in the path management table 433 on the basis of this information. The computer programs 121, 122 other than the trap reception PG 123 will be described later.

Examples of the data include the path management table 124, a resource table 125, and a system switching order table 126. These data 124, 125, 126 will be described later.

The storage device 600 may be a RAID (Redundant Array of Independent (or Inexpensive) Disks) system comprising a large number of disks arranged in array form, for example. However, the present invention is not limited thereto, and the storage device 600 may be constituted by a switch forming a communication network, for example a highly functional intelligent type fiber channel switch. The storage device 600 comprises one or a plurality of channel adapters ("CHA" hereafter) 610, one or a plurality of disk adapters ("DKA" hereafter) 670, cache memory (CM) 640, a connection unit 620, and a plurality of media drives (for example, a hard disk drive or a flash memory drive) 660. A plurality of logical units (LU) 630 are formed on the basis of the storage space of the plurality of media drives 660.

The CHA 610 is a circuit board for performing data communication with the node 400. The DKA 670 is a circuit board for performing data communication with the respective media drives 660. Data to be written to the LU 630 from the node 400 and data read from the LU 630 to be transmitted to the node 400 are stored temporarily in the cache memory 640. The connection unit 620 is a crossbar switch, for example, which connects the CHA 610, DKA 670, and cache memory 640 to each other. One or a plurality of circuit boards carrying a CPU, memory, and so on may function as a control unit of the storage device 600 in place of the combination of the CHA 610, DKA 670, cache memory 640, and connection unit 620.

When the CHA 610 receives a write request specifying a LUN from the node 400, the CHA 610 writes data corresponding to the write request into the cache memory 640, and the DKA 670 writes the data stored in the cache memory 640 into the LU 630 corresponding to the LUN. When the CHA 610 receives a read request specifying a LUN from the node 400, the DKA 670 reads data from the LU 630 corresponding to the LUN in response to an instruction from the CHA 610 and writes the data in the cache memory 640, whereupon the CHA 610 reads the data from the cache memory 640 and transmits the data to the node 400.

Figure 2:
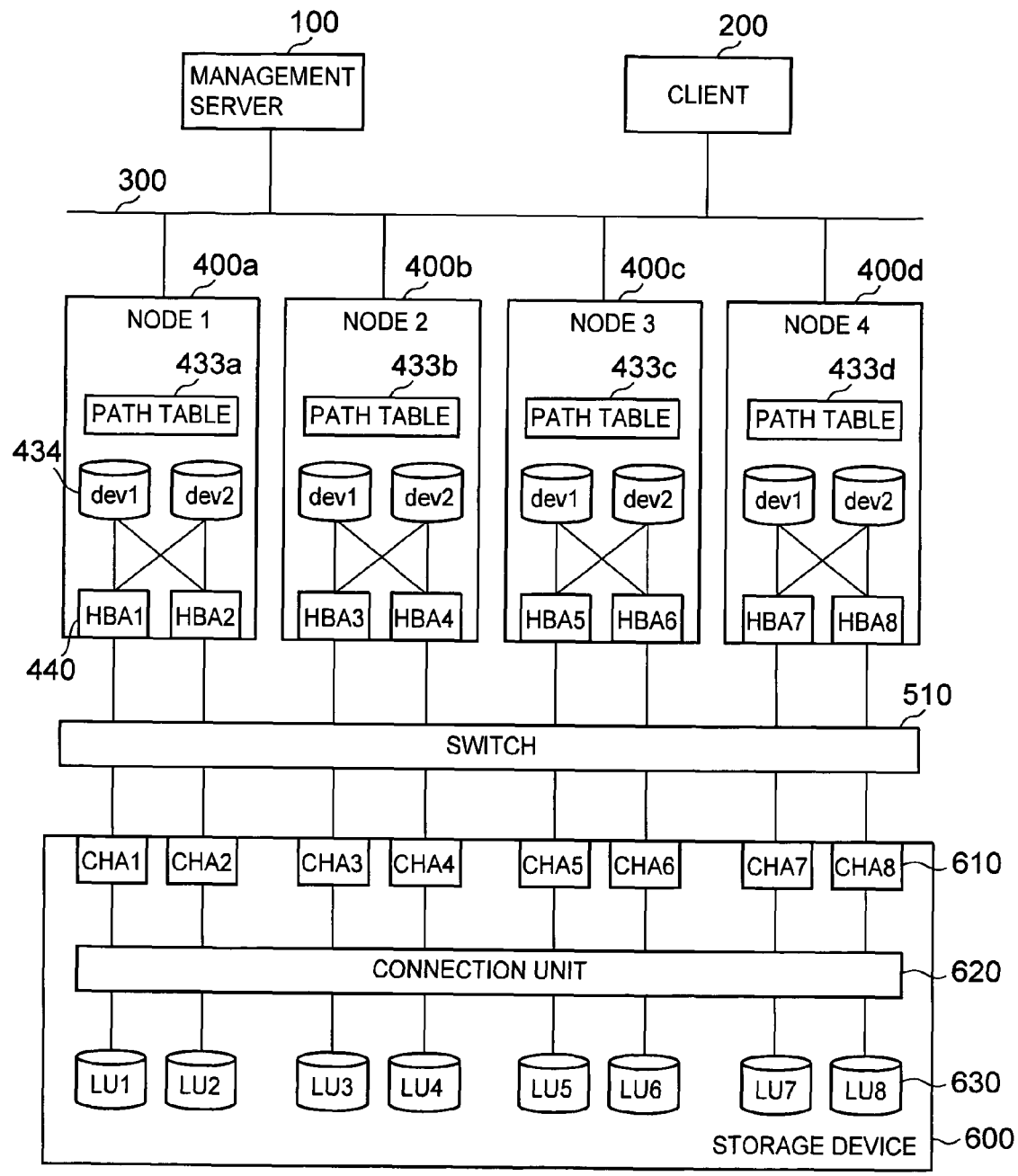
FIG. 2 is a view showing an example of the configuration of a path between nodes and a storage device, according to an embodiment.

FIG. 2 is a view showing an example of the configuration of a path between the node 400 and the storage device 600, according to this embodiment.

As shown in the drawing, in this embodiment, two HBAs 440 are provided for each node 400. Further, eight CHAs 610 and eight LUs 630 are provided in the storage device 600. The SAN 500 is constituted by a switch 510. With this configuration, each node 400 is capable of using a plurality of paths as a path from the dev 434 to the LU 630 by switching the employed HBA 440 and CHA 610. For example, node 1 may use a path passing through HBA 1 and CHA 1, a path passing through HBA 2 and CHA 2, or another path as a path from dev 1 to LU 1. Information relating to the paths that may be used by each node 400 is recorded in the path table 433 provided in each node 400. The path table 433 holds information unique to each node 400.

FIG. 3 is a view showing examples of the path table 433.

FIGS. 3A, 3B, 3C and 3D show path tables 433a, 433b, 433c and 433d of node 1, node 2, node 3 and node 4, respectively. The path tables 433 have similar configurations, and therefore the path table 433a of node 1 will be described as an example.

The path table 433a is recorded with information relating to the paths from the dev 434 to the LU 630 that may be used by node 1. A path ID 4331, a logical device ID 4332, an HBA ID 4333, a CHA ID 4334, an LU ID 4335, and a path state 4336 are recorded in the path table 433a for each path. The path ID 4331 is an identifier for specifying the corresponding path uniquely in node 1. Accordingly, the path ID 4331 may take a unique value (a name, a numerical value, or the like) in node 1. The logical device ID 4332 is an identifier for specifying the dev uniquely. The HBA ID 4333 is an identifier for specifying the HBA 440 uniquely. The CHA ID 4334 is an identifier for specifying the CHA 610 uniquely. The LU ID 4335 is an identifier for specifying the LU 630 uniquely. The path constitution is indicated by a combination of the logical device ID 4332, HBA ID 4333, CHA ID 4334, and LU ID 4335. For example, in the path table 433a, a path having the path ID 4331 "0001" is constituted by dev 1, HBA 1, CHA 1, and LU 1. Hence, it can be learned that the path having the path ID 4331 "0001" extends from dev 1 to LU 1 and passes through HBA 1 and CHA 1. The path state 4336 is information indicating whether the corresponding path is active (online) or inactive (offline). For example, when a fault occurs in CHA 3, the path that passes through CHA 3 (the path having the path ID "0007") can no longer be used, and therefore the path state 4336 of this path is set at "Offline". The path state 4336 may be set by the driver management PG 425, for example. Upon detection of a path fault, the driver management PG 425 is capable of setting the path state 4336 of the corresponding path to "Offline", and upon detection of a path recovery, the driver management PG 425 is capable of setting the path state 4336 of the corresponding path to "Online".

Figure 4:
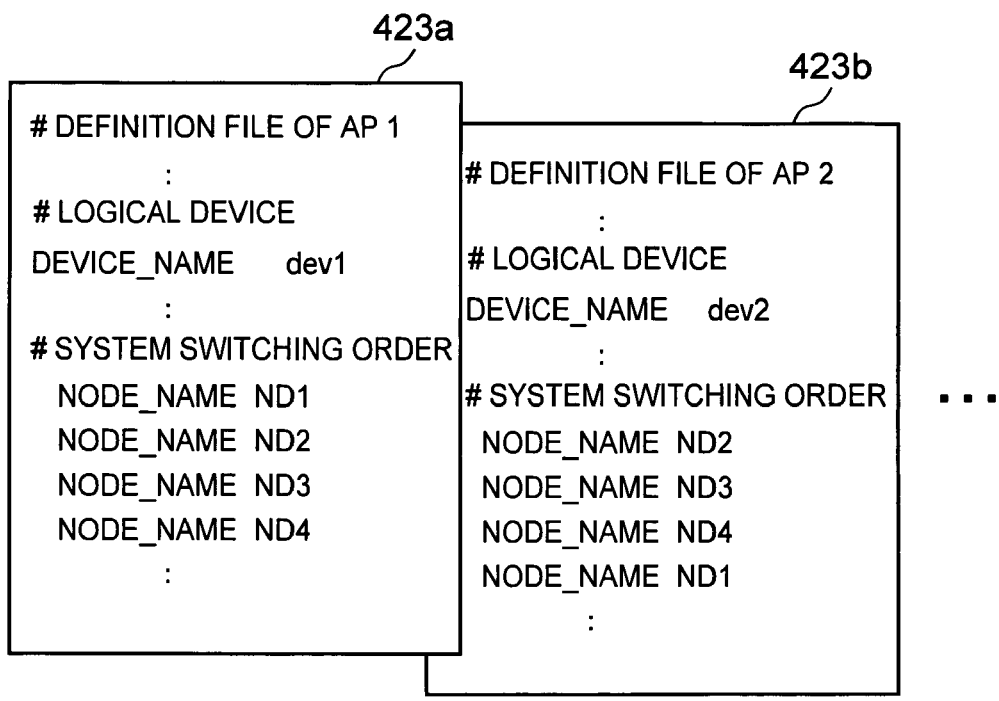
FIG. 4 is a view showing examples of an AP definition file.

FIG. 4 is a view showing examples of the AP definition file 423.

The AP definition file 423 is a file carrying information relating to the AP 421, and is prepared for each AP 421. In the drawing, the reference symbol 423a denotes the AP definition file of AP 1 and the reference symbol 423b denotes the AP definition file of AP 2. The name of the logical device (logical device name) used by the AP 421 and information indicating the system switching order, for example, are recorded in the AP definition file 423. In this embodiment, the logical device ID is recorded as the logical device name. The system switching order is an order of the nodes 400 used during node switching, or in other words an order (order of precedence) of the nodes 400 for determining the main node. Of the plurality of nodes 400 capable of running the AP 421, the first node 400 in the system switching order is set as the main node, and the other nodes 400 are set as standby nodes. When a fault occurs in the main node, the first standby node 400 in the system switching order is selected, and the selected node 400 becomes the main node. As shown in the drawing, the system switching order is defined by arranging the node IDs of the nodes 400 capable of running the AP 421 vertically, for example. When this definition method is employed, the nodes 400 placed toward the top of the order are defined as nodes 400 having a higher order of precedence or nodes 400 having a lower order of precedence. In this embodiment, the nodes 400 placed toward the top of the order are assumed to be nodes 400 having a higher order of precedence.

In the AP definition file 423a of AP 1, "dev 1" is written as the logical device name. Hence it is evident that AP 1 uses dev 1. Further, "ND 1", "ND 2", "ND 3", and "ND 4" are written in descending order as the information indicating the switching order. Here, ND 1, ND 2, ND 3 and ND 4 serve as identifiers of node 1, node 2, node 3 and node 4, respectively. Hence, it can be seen that the system switching order of AP 1 is node 1→node 2→node 3→node 4, with node 1 serving as the first node, and therefore node 1 serves as the main node during a normal operation (when no fault has occurred).

Meanwhile, in the AP definition file 423b of AP 2, "dev 2" is written as the logical device name. Hence it is evident that AP 2 uses dev 2. Further, "ND 2", "ND 3", "ND 4", and "ND 1" are written in descending order as the information indicating the switching order. Hence, it can be seen that the system switching order of AP 2 is node 2→node 3→node 4→node 1, with node 2 serving as the first node, and therefore node 2 serves as the main node during a normal operation.

Since the system switching order is defined for each AP 421 in this manner, the system switching order may be identical in all of the APs 421 or different in each AP 421. Accordingly, the respective main nodes of AP 1 and AP 2 may be the same node 400, or a standby node of AP 1 may be the main node of AP 2, for example.

FIG. 5 shows an example of the path management table 124.

The path management table 124 is an integrated table of the path tables 433 provided in all of the nodes 400 constituting the system. The path management table 124 is prepared for use in second resource table creation processing, to be described below, for example, and may be omitted when this processing is not performed. The path management table 124 is recorded with a node ID 1241, a path ID 1242, a logical device ID 1243, an HBA ID 1244, a CHA ID 1245, an LU ID 1256, and a path state 1247, for example. The information other than the node ID 1241 (i.e. the logical device ID 1243, HBA ID 1244, CHA ID 1245, LU ID 1256, and path state 1247) is identical to that of the path table 423, and the values recorded in the path tables 423 of each node 400 are set therein as is. The node ID 1241 is a node identifier indicating the node 400 to which the information other than the node ID 1241 relates. The path management table 124 is created by the initialization PG 121, for example. Further, when the trap reception PG 123 receives the path fault/recovery information, the trap reception PG 123 may modify predetermined information (the path state 1247, for example) in the path management table 124 on the basis of this information.

FIG. 6 is a view showing an example of the resource table 125.

The resource table 125 is a table provided for each of the APs 421 that are run in the system for managing information relating to the resources (for example, the node 400, the path from the node 400 to the storage device 600, and so on) required to run the AP 421. An AP ID 1251, which is an identifier for uniquely specifying the AP 421, a logical device ID 1252, which is an identifier of the dev 434 used by the AP 421, and a plurality of node IDs 1253 serving as identifiers for each of the plurality of nodes 400 that run the AP 421, for example, are recorded in the resource table 125 for each AP 421. Further, an online path number 1254, a total path number 1255, and a main node 1256 are recorded for each combination of the AP ID 1251, logical device ID 1252, and node ID 1253. The online path number 1254 is the number of active paths of the paths relating to the dev 434 specified by the logical device ID 1252 in the node 400 specified by the node ID 1253. The total path number 1255 is the total number of paths corresponding to the dev 434 specified by the logical device ID 1252 in the node 400 specified by the node ID 1253. The main node 1256 indicates whether or not the node 400 specified by the node ID 1253 is the main node. For example, when the node 400 is the main node, "True" is set in the main node 1256, and when the node 400 is a standby node, "False" is set in the main node 1256.

The resource table 125 is created by the initialization PG 121, and a part of the information (for example, the online path number 1254 and the main node 1256) is updated by the fail-over updating PG 122 at a predetermined timing. Note that a part of the information in the resource table 125 may be set by means of manager input.

Note that the configuration of the resource table 125 is not limited to that described above. The table 125 may be constituted by a part of the information elements described above, and new information elements may be added thereto. For example, load information (the usage rate of the processor 410 or memory 420, the number of running APs 421, and so on) indicating the load condition of the AP 421 specified by the AP ID 1251 may be recorded for each combination of the AP ID 1251, logical device ID 1252, and node ID 1253. Furthermore, the total path number 1255 and the main node 1256 do not necessarily have to be recorded.

FIG. 7 is a view showing an example of the system switching order table 126.

A system switching order is recorded in the system switching order table 126 for each of the APs 421 that are run in the system. In other words, this table 126 integrates the information indicating the system switching order in each of the AP definition files 423 provided in the node 400 for each AP 421. An AP ID 1261 and a system switching order 1262, for example, are recorded in the system switching order table 126 for each AP 421. As shown in the drawing, the IDs of the nodes 400 are recorded in the system switching order 1262 in order, for example. In the drawing, the nodes 400 recorded further toward the left are nodes 400 having a steadily higher order. Hence, it is evident that the system switching order of AP 1 is node 1→node 2→node 3→node 4, with node 1 serving as the first node, and that the system switching order of AP 2 is node 2→node 3→node 4→node 1, with node 2 serving as the first node.

The system switching order table 126 is created by the initialization PG 121, and the system switching order 1262 is updated by the fail-over updating PG 122 at a predetermined timing. The initialization PG 121 is capable of creating the system switching order table 126 on the basis of the AP definition files 423 provided for each of the APs 421 in each node 400. The initialization PG 121 is also capable of creating the system switching order table 126 on the basis of the resource table 125. The fail-over updating PG 122 updates the system switching order 1262 on the basis of the resource table 125.

When the system switching order 1262 in the system switching order table 126 is updated, all or a part of the nodes 400 that run the AP 421 specified by the corresponding AP ID 1261 are notified of the updated system switching order 1262. Having received this notification, the node 400 modifies the information indicating the system switching order written in the AP definition file 423 to the notified system switching order 1262. Thus, the system switching order of the corresponding AP 421 in the cluster system is modified.

An operation of the management server 100 of the system will now be described.

Figure 8:
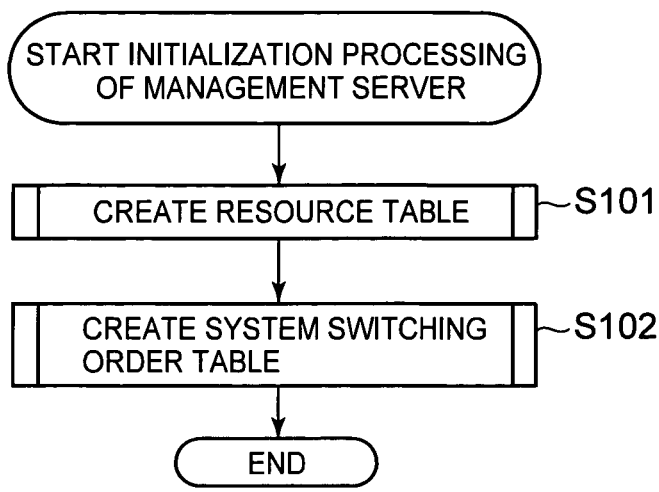
FIG. 8 is a flowchart of processing executed by an initialization PG.

FIG. 8 is a flowchart of processing executed by the initialization PG 121.

First, the initialization PG 121 creates the resource table 125 (S101) Processing for creating the resource table 125 ("resource table creation processing" hereafter) will be described later.

Next, the initialization PG 121 creates the system switching order table 126 (S102). Processing for creating the system switching order table 126 ("system switching order table creation processing" hereafter) will be described later.

The flowchart of processing executed by the initialization PG 121 ends here.

The following two processes may be cited as examples of the resource table creation processing. These processes will now be described in turn.

Figure 9:
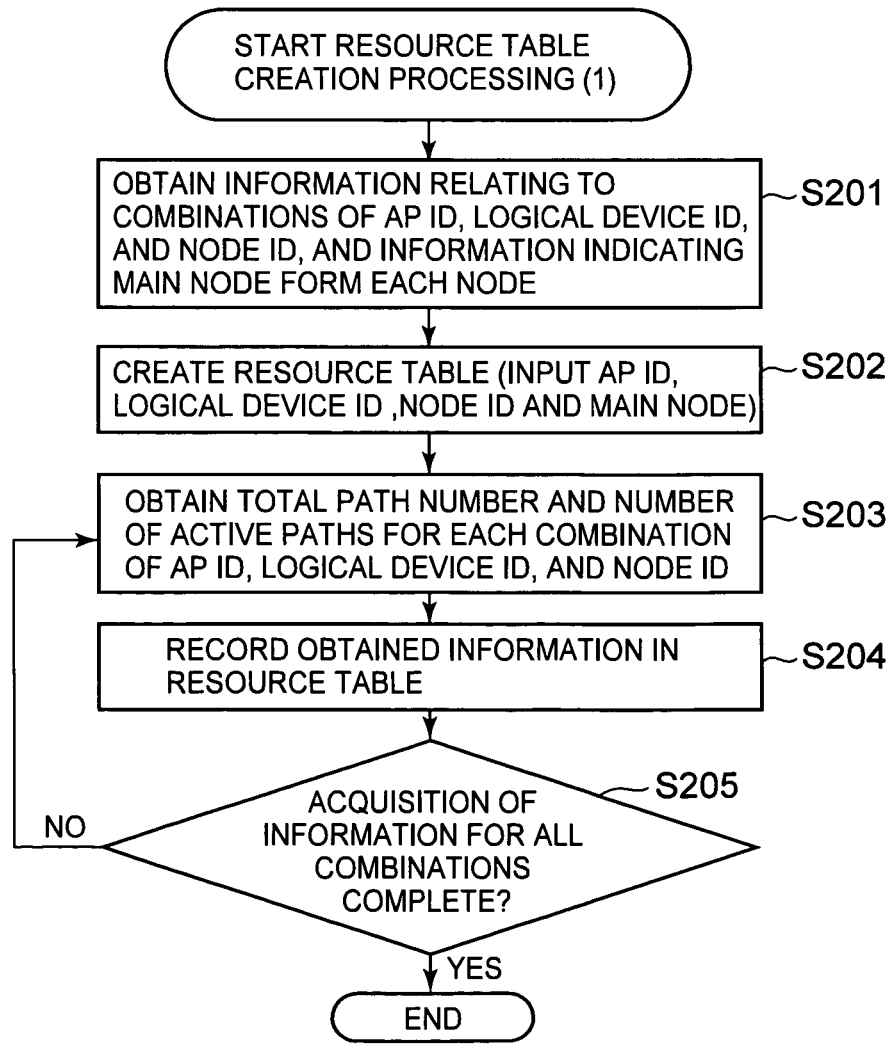
FIG. 9 is a flowchart of first resource table creation processing.

FIG. 9 is a flowchart of first resource table creation processing.

In the first resource table creation processing, all of the information recorded in the resource table is obtained from the node 400.

First, the initialization PG 121 obtains information regarding combinations of the AP ID 1251, logical device ID 1252, and node ID 1253 and information indicating the current main node of each AP 421, which are to be recorded in the resource table 125, from all or a part of the nodes 400 constituting the system (S201). Note that when the main node 1256 is not to be recorded in the resource table 125, the initialization PG 121 need not obtain the information indicating the current main node of each AP 421. The initialization PG 121 can obtain this information from the cluster software 422 in the node 400 by communicating with the cluster software 422.

The cluster software 422 is capable of obtaining the combination information described above, which is to be supplied to the initialization PG 121, from the AP definition file 423 provided therein, for example. When the cluster software 422 comprises the two AP definition files 423a, 423b shown in FIG. 4, for example, it can be learned that two APs 421 (AP 1 and AP 2) are run in the system. Further, as described above, it can be learned from the AP definition file 423a relating to AP 1 that AP 1 uses dev 1, and that the system switching order of AP 1 is node 1→node 2→node 3→node 4. In other words, it is learned that node 1, node 2, node 3 and node 4 exist as the nodes 400 capable of running AP 1. Hence, in this case, the initialization PG 121 is notified of information indicating a combination of AP 1, dev 1, and node 1, a combination of AP 1, dev 1, and node 2, a combination of AP 1, dev 1, and node 3, and a combination of AP 1, dev 1, and node 4. The initialization PG 121 is notified of information regarding the combinations to be recorded in the resource table 125 in relation to AP 2 using a similar method.

Next, on the basis of the information obtained in S201, the initialization PG 121 records a part of the information, namely the AP ID 1251, logical device ID 1252, node ID 1253, and main node 1256, in the resource table 125 (S202).

Next, the initialization PG 121 obtains, for each combination of the AP 421, dev 434, and node 400 recorded in the resource table 125, the total path number relating to the corresponding dev 434 and the number of active paths, from among the paths relating to the corresponding dev 434, from the corresponding node 400 (S203). By communicating with the path management driver 430 in the node 400, the initialization PG 121 can obtain this information from the path management driver 430.

Having received this acquisition request, the path management driver 430 obtains the total path number and number of active paths from the path table 433 provided therein, and informs the management server 100 thereof. For example, when node 1 receives the acquisition request relating to dev 1 and the path table 433a of node 1 is as shown in FIG. 3, the total path number and number of active paths relating to dev 1 are obtained in the following manner. Of the paths recorded in the path table 433a, the number of paths for which "dev 1" is recorded in the logical device ID 4332 is calculated, and the resulting number serves as the total path number. Further, the number of paths for which "Online" is recorded in the path state 433 is calculated from the paths for which "dev 1" is recorded in the logical device ID 4332, and the resulting number serves as the number of active paths.

Next, the initialization PG 121 records the information obtained in S203 in the resource table 125 (S204). More specifically, the number of active paths and total path number obtained in S203 are recorded in the online path number 1254 and total path number 1255 corresponding to the combination of the AP 421, dev 434, and node 400 serving as the information acquisition subject in S203.

The processing of S203 and S204 is repeated until the online path number 1254 and total path number 1255 corresponding to all combinations of the AP 421, dev 434, and node 400 recorded in the resource table 125 have been recorded.

Note that in the first resource table creation processing, the information recorded in S202 may be information that is input by the manager via a UI (not shown) provided by the management server 100, rather than the information that is obtained automatically from the node 400 in S201.

Description of the flowchart of the first resource table creation processing ends here.

Figure 10:
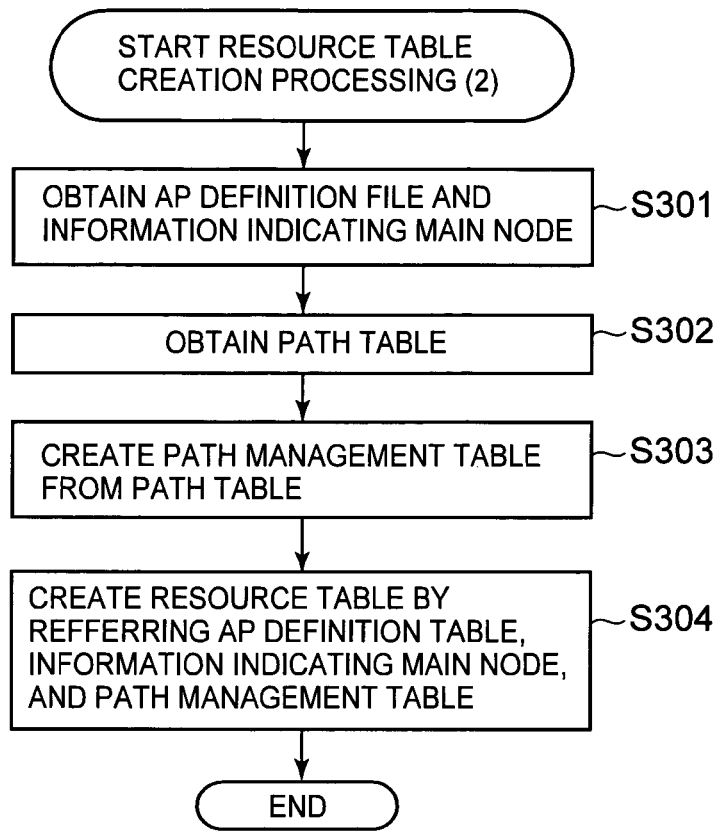
FIG. 10 is a flowchart of second resource table creation processing.

FIG. 10 is a flowchart of second resource table creation processing.

In the second resource table creation processing, the path tables 433 of all of the nodes 400 and the AP definition files 423 relating to all of the APs 421 are obtained from the nodes 400. The integrated path management table 124 is then created from the path tables 433 of all of the nodes 400. The resource table is created by referring to the path management table 124 and the AP definition files 423.

Specifically, first, the initialization PG 121 obtains, from all or a part of the nodes 400 constituting the system, the AP definition files 423 relating to all of the APs 421 that are run in the system and information indicating the current main node of each AP 421 (S301). Note that, similarly to the first resource table creation processing, when the main node 1256 is not to be recorded in the resource table 125, the initialization PG 121 need not obtain the information indicating the current main node of each AP 421. By communicating with each node 400, the initialization PG 121 is capable of obtaining the AP definition files 423 from the cluster software 422.

Next, the initialization PG 121 obtains the path table 433 provided in each node 400 from all of the nodes 400 constituting the system (S302). The initialization PG 121 is capable of obtaining the path tables 433 from the path management driver 430 in the nodes 400 by communicating with the path management driver 430.

Next, the initialization PG 121 integrates all of the path tables 433 obtained in S302 to create the path management table 124 (S303).

Next, the initialization PG 121 creates the resource table 125 by referring to the AP definition files 423 and information indicating the main node obtained in S301 and the path management table 124 created in S303 (S304). The method of obtaining the information combinations of the AP ID 1251, logical device ID 1252, and node ID 1253 recorded in the resource table 125 from the AP definition files 423 is as described above. Further, the method of obtaining the online path number 1254 and total path number 1255 recorded in the resource table 125 from the path management table 124 is substantially identical to the method of obtaining this information from the path table 423 of each node 400 described above.

The flowchart of the second resource table creation processing ends here.

Figure 11:
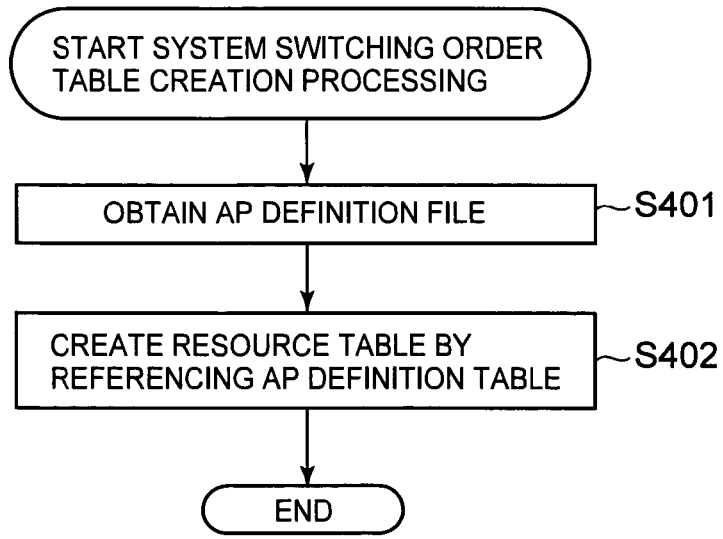
FIG. 11 is a flowchart of system switching order table creation processing.

FIG. 11 is a flowchart of system switching order table creation processing.

First, the initialization PG 121 obtains the AP definition files 423 relating to all of the APs 421 that are run in the system from all or a part of the nodes 400 constituting the system (S401).

Next, the initialization PG 121 creates the system switching order table 126 by referring to the AP definition files 423 obtained in S401 (S402). More specifically, the initialization PG 121 creates the system switching order table 126 such that the system switching order 1262 of each AP 421 in the system switching order table 126 corresponds to the system switching order written in the AP definition file 423 relating to the corresponding AP 421 (S402).

The flowchart of the system switching order table creation processing ends here.

Figure 12:
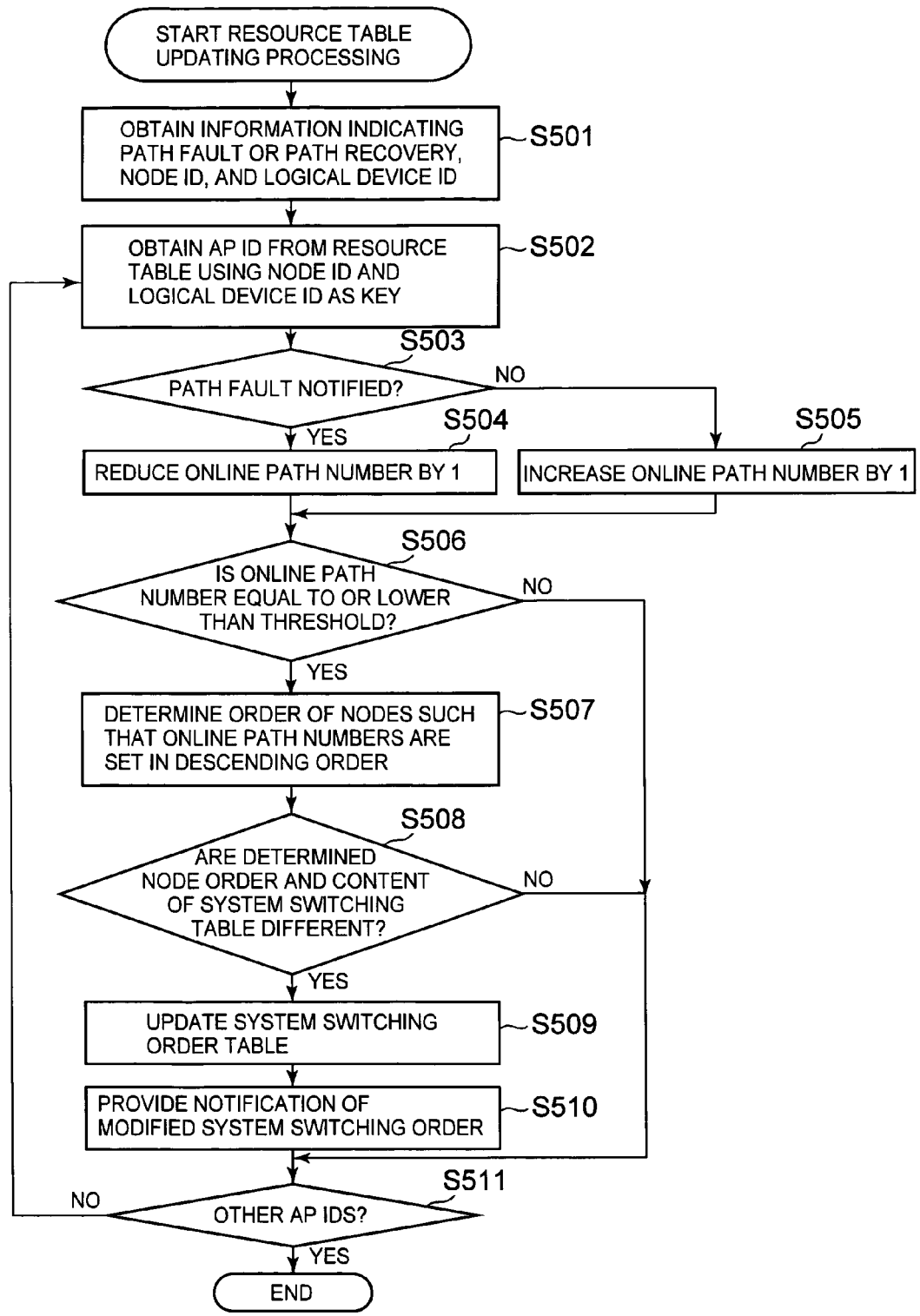
FIG. 12 is a flowchart of processing executed by a fail-over updating PG.

FIG. 12 is a flowchart of processing executed by the fail-over updating PG 122.

This processing begins when the fail-over updating PG 122 is notified of the path fault/recovery information by the trap reception PG 123.

First, the fail-over updating PG 122 obtains, from the notified path fault/recovery information, information indicating whether a path fault or a path recovery has occurred, the ID of the node 400 that detected the path fault or path recovery, and the ID of the dev 434 corresponding to the faulty path or recovered path (S501).

Next, using the ID of the node 400 and the ID of the dev 434 obtained in S501 as a key, the fail-over updating PG 122 obtains the AP ID 1251 corresponding to this information from the resource table 125 (S502). When a plurality of corresponding AP IDs 1251 exist, a single AP ID 1251 is obtained.

Subsequent processing (S503 to S512) is performed in relation to each of the APs 421 specified by the AP ID 1251 obtained in S502.

First, in S503, a determination is made on the basis of the information indicating whether a path fault or a path recovery has occurred, obtained in S501, as to whether or not the path fault/recovery information notification is notification of a path fault or notification of a path recovery. On the basis of the determination result, the fail-over PG 122 updates the resource table 125.

More specifically, when a path fault is notified (S503: YES), the fail-over updating PG 122 reduces the online path number 1254 corresponding to the combination of the AP ID 1251, node 400 ID and dev 434 ID obtained in S501 and S502 by one (S504). On the other hand, when a path recovery is notified (S503: NO), the fail-over updating PG 122 increases the online path number 1254 corresponding to the combination of the AP ID 1251, node 400 ID and dev 434 ID obtained in S501 and S502 by one (S505).

Next, a determination is made as to whether or not the online path number 1254 modified in S504 or S505 is equal to or smaller than a predetermined threshold (S506). This threshold may be set at a predetermined value (1, for example) serving as a default value, or may be set by the manager, for example.

When the online path number 1254 is not equal to or smaller than the predetermined threshold (S506: NO), processing relating to the corresponding AP 421 is terminated. When another AP 421 is recorded in the resource table 125, processing is performed in relation to this AP 421.

When the online path number 1254 is equal to or lower than the predetermined threshold (S506: YES), the system switching order relating to the AP 421 is revised. More specifically, the fail-over updating PG 122 compares the online path numbers 1254 of all of the nodes 400 corresponding to the AP ID 1251 indicating the AP 421, and determines the order of the nodes 400 such that the online path numbers 1254 are set in descending order (S507). The fail-over updating PG 122 then determines whether or not the order of the nodes 400 determined in S507 is different to the current system switching order, or in other words whether or not the order of the nodes 400 determined in S507 is different to the system switching order 1262 corresponding to the AP ID 1261 of the corresponding AP in the system switching order table 126 (S508).

When the order of the nodes 400 determined in S507 is identical to the current system switching order (S508: NO), processing relating to the AP 421 is terminated. When another AP 421 is recorded in the resource table 125, processing relating to this AP 421 is performed.

When the order of the nodes 400 determined in S507 is different to the current system switching order (S508: YES), the fail-over updating PG 122 modifies the system switching order 1262 corresponding to the AP ID 1261 of the corresponding AP in the system switching order table 126 to the order of the nodes 400 determined in S507 (S509). The fail-over updating PG 122 then notifies all or a part of the nodes 400 running the AP of the modified system switching order 1262 (S510). This notification is supplied to the cluster software 422 in the node 400. On the basis of the notified system switching order, the cluster software 422 modifies the information indicating the system switching order in the AP definition file 423.

The processing from S502 to S510 is performed for all of the APs 421 recorded in the resource table 125 (S511).

The flowchart of the processing executed by the fail-over updating PG 122 ends here.

FIGS. 13A and 13B show examples of the system switching order table 126 and AP definition file 423 prior to modification, respectively. FIGS. 14A and 14B show examples of the system switching order table 126 and AP definition file 423 following modification, respectively.

As shown in FIGS. 13A, 13B, 14A and 14B, when the system switching order table 126 in the management server 100 is updated, the information indicating the system switching order in the AP definition file of the node 400 is modified in accordance with this update. More specifically, as shown in FIGS. 13A and 14A, the system switching order 1262 of AP 1 in the system switching order table 126 is modified from node 1→node 2→node 3→node 4 to node 1→node 4→node 3→node 2. Accordingly, as shown in FIGS. 13B and 14B, the information indicating the system switching order in the AP definition file 423 is modified from node 1→node 2→node 3→node 4 to node 1→node 4→node 3→node 2. Further, the system switching order table 126 is not updated in relation to AP 2, and therefore the corresponding information indicating the system switching order is not modified in the AP definition file 423.

According to the embodiment described above, meaningless switching of the nodes 400 can be forestalled, and appropriate switching of the nodes 400 can be performed.

Several embodiments of the present invention were described above, but these embodiments are merely examples for illustrating the present invention, and the scope of the present invention is not limited to these embodiments alone. The present invention may be implemented in various other aspects.

For example, the management server 100 may instruct modification of the system switching order without using the system switching order table 126. More specifically, the management server 100 may inform the node 400 of the system switching order when the resource table 125 is updated, regardless of whether or not the system switching order has been modified. In this case, for example, the cluster software 422, having been informed of a modification in the system switching order, may compare the informed system switching order with the original system switching order in the AP definition file 423 and then determine whether or not to update the AP definition file 423.

Further, in the embodiments described above, the management server 100 determines the system switching order on the basis of the online path number 1254, but may determine the system switching order taking load information indicating the load condition of the AP 421 into account. In this case, for example, the management server 100 may determine the switching order such that nodes having a larger online path number 1254 and a smaller load indicated by the load information corresponding to the AP 421 have a higher order.

Furthermore, the management server 100 may notify the node 400 of information indicating the following active node (i.e. the node having the highest order in the system switching order) rather than the system switching order.

What is claimed is:

1. A node management device comprising:
 a storage resource that stores resource information, for each of three or more nodes that run an application and issue an I/O request to a storage device, wherein said resource information
 relates to a resource used by said application, and
 includes a number of active paths, which is a number of active paths from among a plurality of paths used by said application, for each of said nodes;
 a reception unit that receives resource condition information, wherein said resource condition information
 indicates variation in a condition of said resource from each of said nodes,
 includes fault information indicating a fault or a fault recovery in a path from said plurality of paths, and
 includes node information specifying the node that detects said fault or said recovery;
 an updating unit that updates said resource information on the basis of said resource condition information received by updating said number of active paths corresponding to said node specified by said node information in said resource information on the basis of said fault information and said node information;
 a determination unit that determines a following active node by determining, on the basis of said updated resource information, that a node having the largest number of active paths, from among nodes other than a current active node, is the following active node; and
 a notification unit that notifies at least one of said three or more nodes of information indicating said following active node determined by said determination unit.

2. The node management device according to claim 1, wherein, when said fault information indicates a fault in said path, said updating unit reduces said number of active paths corresponding to said node specified by said node information in said resource information, and when said fault information indicates a fault recovery in said path, said updating unit increases said number of active paths corresponding to said node specified by said node information in said resource information.

3. The node management device according to claim 2, wherein said fault information received by said reception unit includes information indicating a fault or a fault recovery in said path, and a number of faulty paths, which is a number of paths in which a fault or a fault recovery has occurred, and
 when said fault information indicates a fault in said path, said updating unit reduces said number of active paths corresponding to said node specified by said node information in said resource information by said number of faulty paths, and when said fault information indicates a fault recovery in said path, said updating unit increases said number of active paths corresponding to said node specified by said node information in said resource information by said number of faulty paths.

4. The node management device according to claim 1, wherein said determination unit determines a node switching order indicating the order of said following active node and a subsequent active node order on the basis of said resource information updated by said updating unit, and
 said notification unit notifies at least one of said three or more nodes of said node switching order determined by said determination unit.

5. The node management device according to claim 4, wherein said resource information includes an number of active paths, which is a number of active paths from among a plurality of paths used by said application, of each of said nodes,
 said resource condition information received by said reception unit includes fault information indicating a fault or a fault recovery in said path, and node information specifying the node that detects said fault or said recovery,
 said updating unit updates said number of active paths corresponding to said node specified by said node information in said resource information on the basis of said fault information and said node information, and
 said determination unit determines said node switching order on the basis of said resource information updated by said updating unit such that said nodes are arranged in descending order of said number of active paths.

6. The node management device according to claim 5, further comprising:
 node switching order information indicating said node switching order; and
 a second updating unit that compares a first node switching order determined by said determination unit and a second node switching order indicated by said node switching order information, and updates said node switching order indicated by said node switching order information to said first switching order when said first node switching order and said second node switching order are different, wherein, when said node switching order information is updated, said notification unit notifies said nodes of said first switching order.

7. The node management device according to claim 5, wherein, when said number of active paths updated by said updating unit is equal to or lower than a predetermined threshold, said determination unit determines said node switching order on the basis of said resource information updated by said updating unit such that said nodes are arranged in descending order of said number of active paths.

8. The node management device according to claim 1, wherein each of said three or more nodes has a plurality of applications, said resource information includes said number of active paths for each combination of said application and said node on which said application is run, said resource condition information received by said reception unit includes, in addition to said fault information and said node information, application information specifying said application, said updating unit updates said number of active paths corresponding to a combination of a node specified by said node information and an application specified by said application information in said resource information on the basis of said fault information, said node information, and said application information, and said determination unit determines said node having the largest number of active paths, from among said nodes other than said current active node, to be said following active node in relation to said three or more nodes having said application specified by said application information and on the basis of said resource information updated by said updating unit.

9. The node management device according to claim 8, wherein said resource information includes said number of active paths and load information indicating a load of said application for each combination of said application and said node on which said application is run, and said determination unit determines a node having the largest number of active paths of said nodes other than said current active node and the smallest load indicated by said load information corresponding to said application specified by said application information to be said following active node in relation to said three or more nodes having said application and on the basis of said resource information updated by said updating unit.

10. A node management method comprising the steps of:
receiving resource condition information, wherein said resource condition information indicates variation in a condition of a resource used by an application from each of three or more nodes that run said application and issue an I/O request to a storage device, and includes fault information from said nodes indicating a fault or a fault recovery in a path from said plurality of paths, and node information specifying the node that detects said fault or said recovery;

updating resource information, wherein said resource information relates to said resource used by said application, in relation to each of said three or more nodes on the basis of said resource condition information, and wherein said resource information includes a number of active paths, which is a number of active paths from among a plurality of paths used by said application, for each of said nodes, and wherein said updating includes updating said number of active paths corresponding to said node specified by said node information in said resource information on the basis of said fault information and said node information;

determining a following active node by determining, on the basis of said updated resource information, that a node having the largest number of active paths, from among nodes other than a current active node, is the following active node; and notifying at least one of said three or more nodes of information indicating said determined following active node.

11. The node management method according to claim 10, wherein, when said fault information indicates a fault in said path during updating of said resource information, said number of active paths corresponding to said node specified by said node information is reduced in said resource information, and when said fault information indicates a fault recovery in said path, said number of active paths corresponding to said node specified by said node information is increased in said resource information.

12. The node management method according to claim 11, wherein said fault information includes information indicating a fault or a fault recovery in said path, and a number of faulty paths, which is a number of paths in which a fault or a fault recovery has occurred, and when said fault information indicates a fault in said path during updating of said fault information, said number of active paths corresponding to said node specified by said node information is reduced in said resource information by said number of faulty paths, and when said fault information indicates a fault recovery in said path, said number of active paths corresponding to said node specified by said node information is increased in said resource information by said number of faulty paths.

13. The node management method according to claim 10, wherein, when determining said following active node, a node switching order indicating the order of said following active node and a subsequent active node order is determined on the basis of said updated resource information, and when notifying said nodes, at least one of said three or more nodes is notified of said determined node switching order.

14. The node management method according to claim 13, wherein said resource information includes an number of active paths, which is a number of active paths from among a plurality of paths used by said application, of each of said nodes, said resource condition information includes fault information indicating a fault or a fault recovery in said path, and node information specifying the node that detects said fault or said recovery, when updating said resource information, said number of active paths corresponding to said node specified by said node information is updated in said resource information on the basis of said fault information and said node information, and when determining said following active node, said node switching order is determined on the basis of said updated resource information such that said nodes are arranged in descending order of said number of active paths.

15. The node management method according to claim 14, further comprising the step of comparing a first node switching order determined on the basis of said updated resource information and a second node switching order indicated by node switching order information indicating said node switching order, and updating said node switching order indicated by said node switching order information to said first switching order when said first node switching order and said second node switching order are different, wherein, when said node switching order information is updated and said nodes are to be notified thereof, at least one of said three or more nodes is notified of said first switching order.

16. The node management method according to claim 14, wherein, when said updated number of active paths is equal to or lower than a predetermined threshold and said following active node is to be determined, said node switching order is determined on the basis of said updated resource information such that said nodes are arranged in descending order of said number of active paths.

17. The node management method according to claim 10, wherein each of said three or more nodes has a plurality of applications, said resource information includes said number of active paths for each combination of said application and said node on which said application is run, said resource condition information includes, in addition to said fault information and said node information, application information specifying said application, when updating said resource information, said number of active paths corresponding to a combination of a node specified by said node information and an application specified by said application information is updated in said resource information on the basis of said fault information, said node information, and said application information, and when determining said following active node, said node having the largest number of active paths, from among said nodes other than said current active node, is determined to be said following active node in relation to said three or more nodes having said application specified by said application information and on the basis of said updated resource information.

18. The node management method according to claim 17, wherein said resource information includes said number of active paths and load information indicating a load of said application for each combination of said application and said node on which said application is run, and when determining said following active node, a node having the largest number of active paths of said nodes other than said current active node and the smallest load indicated by said load information corresponding to said application specified by said application information is determined to be said following active node in relation to said three or more nodes having said application and on the basis of said updated resource information.

\* \* \* \* \*